AUTOMATIC FOCUSING SYSTEM FOR BEAM DEVICES

Filed Aug. 29, 1966 2 Sheets-Sheet 1

INVENTORS.
FRED KURZWEIL, Jr.
ROBERT R. BARBER
MARTIN H. DOST
BY Gerald L. Moore
ATTORNEY

AUTOMATIC FOCUSING SYSTEM FOR BEAM DEVICES

Filed Aug. 29, 1966 2 Sheets-Sheet 2

United States Patent Office 3,409,799
Patented Nov. 5, 1968

3,409,799
AUTOMATIC FOCUSING SYSTEM
FOR BEAM DEVICES

Fred Kurzweil, Jr., Saratoga, Robert R. Barber, San Jose, and Martin H. Dost, Los Gatos, Calif., assignors to International Business Machines Corporation, Armonk, N.Y., a corporation of New York Filed Aug. 29, 1966, Ser. No. 575,730
8 Claims. (Cl. 315—31)

ABSTRACT OF THE DISCLOSURE

A beam focusing device wherein the beam is scanned across an alternately transparent and opaque target and an average indication of the rise time of the beam intensity is measured at a point beyond the target as the beam moves past to generate an electrical signal, which signal is differentiated and peak detected to gain an indication of the beam focus condition. By dithering the beam focus and synchronously comparing the signals, a continuous differential signal is generated for resetting the beam focus until the focus conditions at each end of the dither are equalized, thereby indicating the beam is focused to a minimum spot size at the target.

The present invention relates to a system for detecting the size of an electron beam or other beam devices and for focusing the beam automatically onto a memory element.

The invention may be employed in such beam devices as electron beam recorders in which it is desirable to maintain the beam precisely focused in the plane of a memory element. Other uses for the device include electron microscopes, lasers or such other instruments wherein a beam needs to be detected and focused to a minimum spot size onto a memory element.

One object of this invention is to provide an improved system for focusing a beam precisely and automatically.

Another object of this invention is to detect automatically and accurately the spot size of a beam such as the beam of an electron beam device.

Another object of this invention is to provide an automatic focusing system for an electron beam device wherein the size of the electron beam is detected and used for focusing the beam.

Yet another object of this invention is to focus a beam automatically without need for calibration of the focusing system.

Still another object of this invention is to provide a system for focusing a beam onto a memory element by detecting repeatedly the beam spot size at the plane of the memory element in an accurate manner and automatically re-adjusting the focus of the beam to obtain always the smallest spot size possible.

In accordance with the present invention, a beam-focusing system is provided for a beam generating device, which system functions to detect the spot size at the memory element and thereafter utilizes the spot size indication to adjust continually the beam focusing for projecting the smallest spot size possible onto the memory element. The beam focusing system thereby can be used to periodically monitor the beam spot size and adjust the focus of the beam to increase the density and clarity at which data can be recorded onto a memory element.

Other and further objects, features and advantages of this invention will be apparent from the following particular description of a preferred embodiment of the invention as illustrated in the accompanying drawings in which.

Figure 1:
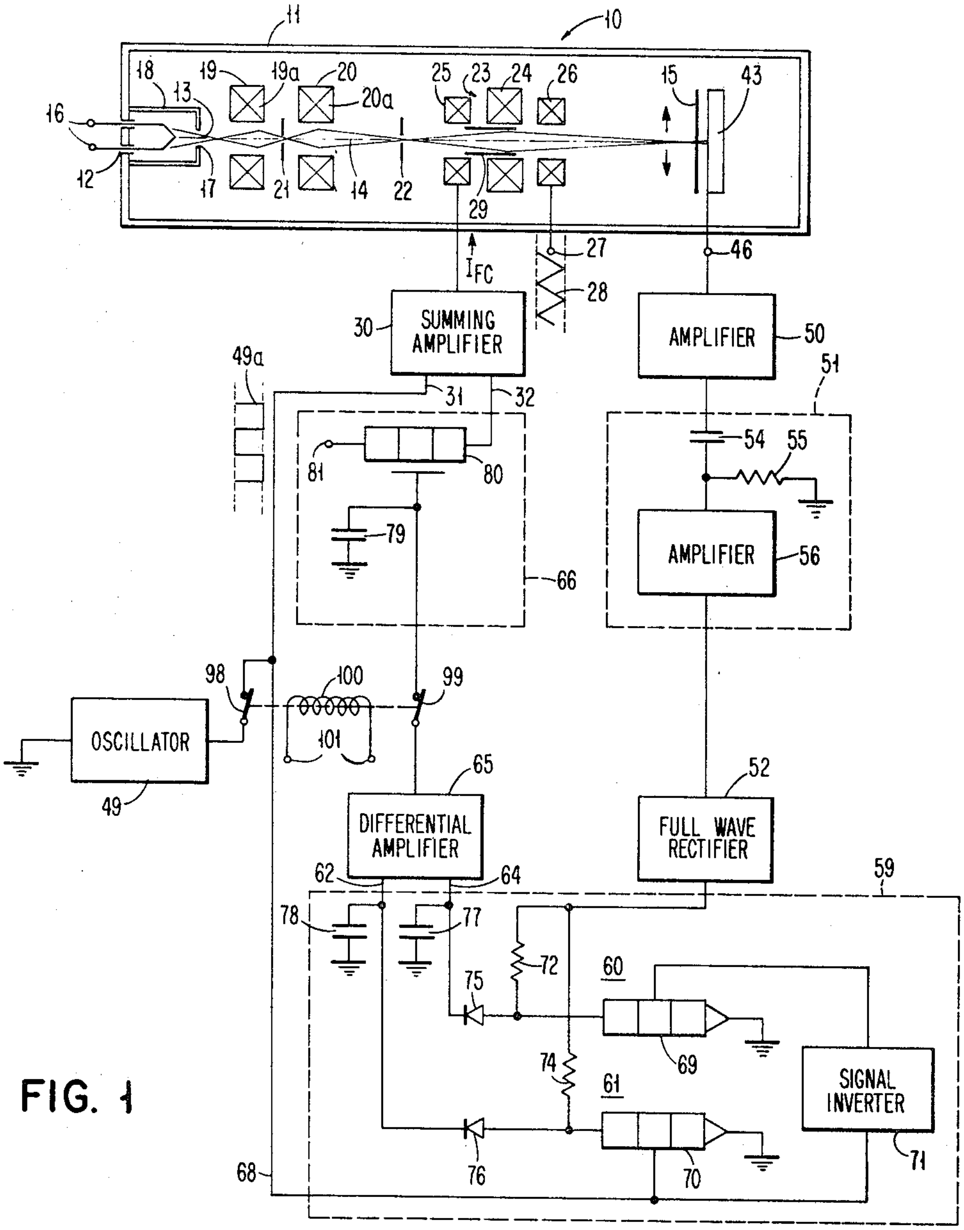
FIGURE 1 represents in diagrammatic and schematic form an electron beam device and a focus control circuit embodying a preferred form of the invention.

In FIGURE 1 is shown an electron beam recorder 10 which is one type of beam generating device in which the subject invention can be employed. The recorder 10 comprises an elongated tubular housing 11 having a cathode 12 supported in one end for emitting a beam of electrons 13 which passes along the axis 14 of the housing 11 and strikes a planar memory element 15. By connecting the contacts 16 of the cathode 12 to a substantially constant magnitude electric current source (not shown), the cathode is heated and caused to emit electrons at a near constant rate, some of which pass through an opening 17 in the anode 18 to form the electron beam. The beam is focused successively by the magnetic fields of the lenses 19 and 20 resulting from the energization of electric coils 19*a* and 20*a*, and is passed through the aperture plates 21 and 22 to reduce the beam spot size. Thereafter, the beam is focused by the magnetic field of the lens 23 resulting from the energization of the coarse focusing electric coil 24 and the vernier electric coil 25, which coils cooperate when properly energized to focus the beam at a point coinciding with the plane of the memory element 15.

Figure 3:
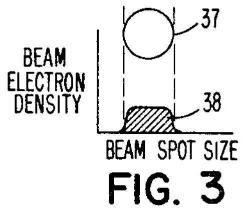
FIGURES 3 and 4 show graphically the cross-sectional variations in current density of the beam for particular beam spot sizes.
Figure 4:
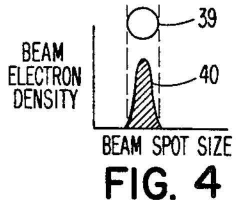

For purposes of this description, FIGURE 3 illustrates the outline of a typical spot size of a beam 37 at the plane of the memory element with the distribution of the beam current $I_B$ being illustrated by the curve 38. While the beam is shown as having a distinct boundary, this boundary outlines only the beam area wherein the particle density is greater than a preselected value and the beam, in fact, has no distinct outline. FIGURE 4 shows a beam focused to a smaller spot size than that of FIGURE 3, as illustrated by the spot cross-sectional outline 39, with the distribution of the beam current $I_B$ appearing as illustrated by the curve 40. Since the beam current is maintained constant the areas under the curves 38 and 40 remain substantially equal.

To increase the density of the digital data that the recorder writes on the memory element, the spot size must be maintained small by precisely focusing the beam to reduce the size of the electron beam trace on the memory element 15. For focusing the beam, the coil 24 of the focusing lens 23 is energized at substantially a constant current level to focus the beam to a point a short distance along the axis 14 beyond the plane of the memory element. Additionally, a vernier focusing coil 25 controlled by a lens driver 30 can be energized to establish a flux field aiding that of the coil 24. As the electric current supplied to the vernier focusing coil is increased, there results an increase in the focal power of the lens 23 for adjusting the primary focusing point of the beam to coincide with the plane of the memory element. The focusing lens driver or summing amplifier 30 supplies an electric current $I_{FC}$ to the focusing coil 25 at a magnitude responsive to control signals received at terminals 31 and 32.

Figure 2:
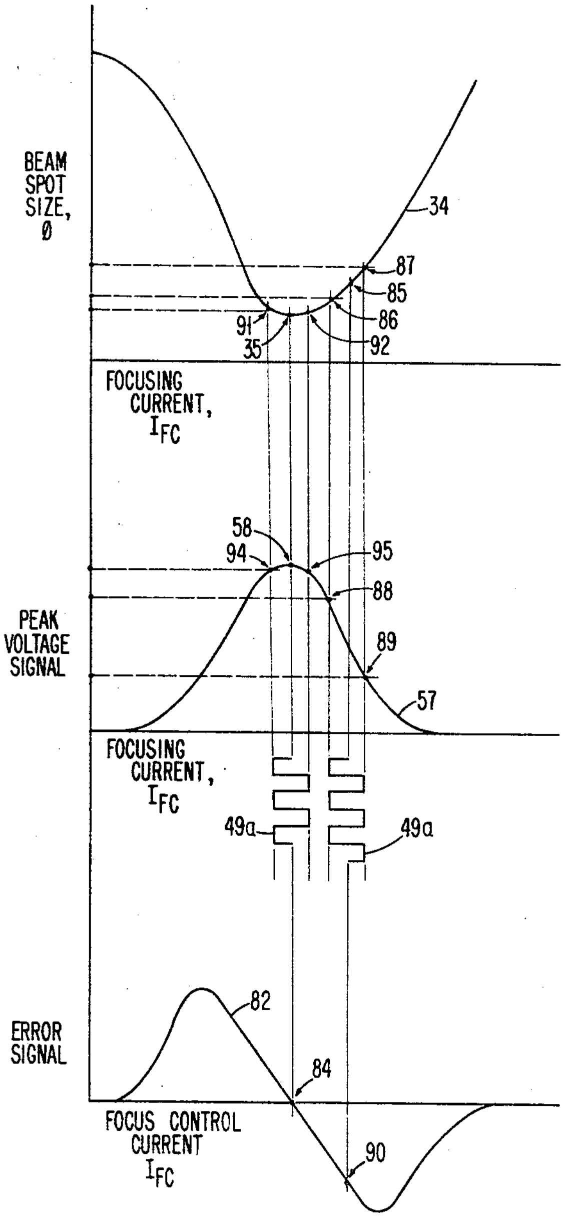
FIGURE 2 illustrates graphically the change in spot size and various other signals of the focus control circuit of FIGURE 1 resulting as the focusing coil current is varied.

The curve 34 of FIGURE 2 shows graphically the change in the electron beam spot size $\phi$ at the plane of the memory element 15 as the electric current supplied to the vernier focusing coil 25 is varied. Note that as the current $I_{FC}$ first is increased in magnitude, the spot size diminishes as the beam focusing point is moved towards the memory element, until at point 35 it reaches a minimum size upon being focused directly in the plane of the memory element. After being focused directly onto the memory element, a further increase in the magnitude of the focusing coil current causes an increase in the spot size since the beam focusing point is moved progressively further in front of the memory element due to the resulting increase in the focal power of the lens.

The memory element 15 is made of a suitable recording material, such as a thermoplastic material or a silver halide film, on which a change can be effected by the striking of the beam to record the trace of the beam. Proper energization of an electromagnetic deflecting coil 26, such as by supplying to the terminal 27 a signal 28 (FIGURE 1), causes the beam to scan repeatedly across the memory element. For recording data, the electron beam is modulated by a suitable means such as by alternately energizing and de-energizing a pair of electrostatic plates 29 which deflect the beam out of alignment with an aperture to act as a valve for alternately preventing and allowing the beam to strike the memory element as it is scanned. While not shown, in most instances means will be provided also to maintain the beam at a constant current level for accurately recording the data. Also, the memory element is supported such that, once recorded, it can be shifted out of the path of the electron beam and another memory element moved into place for exposure to the beam.

With an electron beam recorder of the type just described, data can be recorded on a memory element 15 at very high densities if precise control is maintained over the beam. One of the more critical areas which must be controlled is the focusing of the beam at the memory element. Naturally, as the beam spot size increases with an out-of-focus condition, the density of the data that can be recorded decreases since the size of the beam trace increases. To provide a recorder capable of unattended operation, a repeatable monitoring and refocusing system is needed which reacts to an accurate indication of the actual beam focus condition.

Frequent monitoring of the beam focus is desirable since experience has shown that merely providing a constant magnitude current signal to the focusing coil once the beam has been focused onto the memory element does not assure that the beam will remain in the focus condition selected. Such variables as a change in beam current level, changes in the focal powers of the other lenses of the recorder, or a slight shifting in the position of the memory element will immediately result in the focus point of the beam not coinciding with the plane of the memory element. However, previous focusing devices have been either of the type which are set manually by an operator and thus require constant manual adjustment, or else rely on a beam size-detecting arrangement (such as the light emission of a phosphorescent material) for setting the focus of the beam. Naturally, these previously used beam size-detecting arrangements introduce other variables such as a deterioration in the light emission capabilities of the phosphor into the focusing control and have not been reliable in constantly maintaining the beam precisely focused.

In accordance with the present invention, an automatic beam-focusing system is provided for a beam device such as the electron beam recorder 10 for periodically focusing the beam generated within the recorder to the smallest spot size possible onto the memory element 15. The automatic focusing system utilizes as one feature of the invention a method of detecting the actual beam cross-sectional size by scanning the beam across a perforated target and detecting the instantaneous intensity or current changes at places beyond the grid as the beam alternately is intercepted and allowed to pass through the target, thereby generating a signal directly responsive to the beam spot size at the target.

Figure 5:
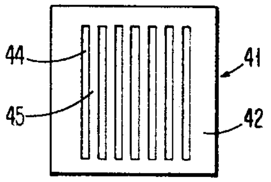
FIGURE 5 shows one type of target which may be utilized in the present invention.

To detect the actual size of the beam, a target 41 (FIGURE 5) is inserted into the path of the beam in place of the movable memory element 15. This target is comprised of a thin metal foil 42 into which is etched a series of rectangular holes 44 leaving grid lines 45 which are opaque to the electron beam. Naturally, as the beam is scanned along a path normal to the lines 45, at a known rate, it is alternately blocked by the opaque lines formed in the sheet 42 and then allowed to pass after the beam is scanned out of alignment with each line ot pass through one of the holes 44. Immediately behind the target is positioned an electron sensitive P-N junction detection device 43 (FIGURE 1) which senses and generates a signal appearing at the terminal 46 thereof, responsive to the current of the beam that passes through the target. By detecting the rate of change of the current passing through the target, a signal directly related to the beam spot size is generated.

Figure 6:
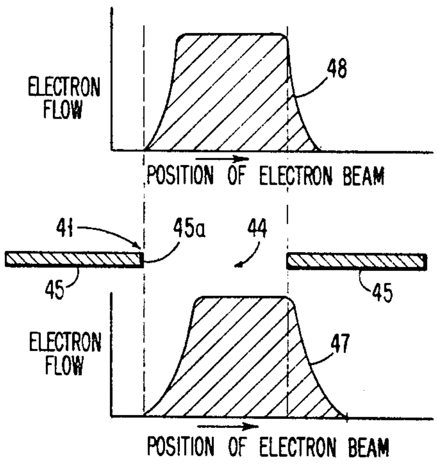
FIGURE 6 shows graphically the beam current detected beyond the target as two different beam sizes are scanned across the portion of the target illustrated in greatly enlarged form.

In FIGURE 6 is illustrated an enlarged cross-section of the target 41 with the increasing and decreasing current sensed by the detector 43 being shown graphically. Note that the rate of change of the current varies inversely with the spot size of the beam intercepted by the target. For instance, the curves 47 and 48 represent the magnitude of the beam currents detected by the detector 43 as the beams of the relative sizes indicated in FIGURES 3 and 4, respectively, are scanned alternately across a pair of opaque lines 45 and through the hole 44 therebetween. If the scanning speed of the beam and the beam current both are maintained substantially constant, the smaller beam in passing from alignment with a line 45 will effect a sudden current rise since the total spot will pass the trailing edge 45*a* of each grid line very quickly and the current density is greater within the beam cross-sectional area. With the spot being larger (as illustrated in FIGURE 3) the detector senses a more gradual current rise in comparison to the current rise for the smaller beam illustrated in FIGURE 4, since the beam diameter is much larger and the current density is proportionally less. Thus, by detecting the rate of change of the current passing beyond the grid as the beam is scanned across the opaque lines 43 of the target, a signal is generated directly related to the size of the beam being scanned. It is obvious the rate of change of the signal generated by the detector 43 can be measured to give a direct indication of the physical size of the beam. Also, by scanning the beam across the plurality of grid lines 45 and by averaging the detector signal, an even more accurate indication of the beam spot size is obtainable.

As another feature of the invention, circuit means is provided utilizing the described beam size detecting arrangement for regularly monitoring the beam spot size for setting the beam focus to obtain the smallest beam spot size possible. As each memory element 15 is fully recorded, it is shifted out of the recorder and another such element substituted in place. The focusing system serves to interject in place of the removed element and before the next unexposed element is brought into the recorder, a target 41 for checking the focus of the beam and for resetting the focus point of the lens 23, if needed, to obtain the smallest spot size possible at the plane of the memory element. It should be understood that the target also can be supported in a permanent position immediately adjacent to the memory element so as to be exposed to the beam when the memory element is removed, or in some cases can be formed directly on the memory element by locating opaque lines thereon with equally beneficial operation of the focus control.

The automatic focusing system is activated when the target 41 is positioned in the operating position and functions to supply a square wave signal to the vernier focusing coil 25 of the focusing lens 23 resulting in the beam being energized alternately, or dithered, to a pair of secondary crossover points in front of and behind the primary focus point determined primarily by the excitation of the coil 24. During the time the beam is focused at these secondary focus points, the beam is being scanned across the target with the beam spot size at the target being detected for each secondary focus point. Thus, signals are derived which are indicative of the spot size at the target as the beam is dithered to each of the secondary focus points, which signals are compared to generate a control signal used for adjusting the primary beam focusing point such that the secondary focus spot sizes at the target grid are equal and thus positioned one on each side of the target. Thereafter, when the dithering signal is cut off, the focus of the beam returns to the primary focus point which is positioned midway between the secondary focus points. Since the spot sizes at each of the secondary focus points measured in the plane of the memory element have been made equal thereby indicating these secondary points are at equal distances in front of and beyond the target, the resulting primary focus point of the beam will coincide directly with the plane of the memory element.

For dithering the focusing of the electron beam, a 240 cycle per second square wave signal 49*a* (FIGURE 1) is supplied to the terminal 31 of the lens driver 30 from a standard oscillator 49, resulting in the focusing coil 25 being supplied a square wave current signal for alternately focusing the beam at secondary focus points equal distances ahead of and beyond the primary focus point determined by a pre-selected constant magnitude focusing signal supplied to the coils 24 and 25. Simultaneously, the sawtooth signal 28 is supplied from a suitable source (not shown) to the terminal 27 of the deflection coil 26 for scanning the beam across the target 41 positioned in place of the memory element 15. The scanning frequency preferably is synchronized with the dithering signal such that the beam is scanned across the grid a given number of times as the beam is focused at each secondary focus point. For example, with the dithering signal being at 240 cycles per second, it has been found suitable to use a scanning signal 28 of the frequency of 120 cycles per second.

The beam current signal generated by the detector 45 during the scanning of the beam is amplified by a standard amplifier 50 and differentiated in the circuit 51, with the resulting signal being rectified by a full wave rectifier 52 to generate an average current rate-of-change signal indicative of the beam spot size. The differentiating circuit includes a capacitor 54 with a resistor 55 connected to ground for generating the derivative signal which then is amplified by a standard amplifier 56 before being transmitted to the full wave rectifier 52.

The 240 cycle dithering signal generated by the oscillator 49 is supplied to a synchronous switch 59 which receives also the spot size signals from the full wave rectifier 52. By synchronizing the operation of the switch 59 such that it feeds the spot size signals into a pair of sample-and-hold circuits 60 and 61 alternately with the dithering of the beam, peak voltage signals are generated indicative of the beam spot sizes at the target for the beam being focused at each of the secondary focus points. The manner in which the peak voltage signals vary is represented by the curve 57 (FIGURE 2). The curve 57 shows that for small and large values of focusing coil current $I_{FC}$, the peak voltage signals are small since the beam substantially is unfocused and thus the spot size in the plane of the memory element 15 is large resulting in a very small peak voltage being generated since the peak voltage signal varies inversely with the beam spot size. However, as the current $I_{FC}$ is adjusted to obtain a maximum peak voltage signal represented by the point 58 on the curve 57, the value of $I_{FC}$ corresponds with that of the point 35 indicating the minimum spot size on the curve 34. These signals are fed into the terminals 62 and 64 of a standard DC differential amplifier 65 which detects and amplifies the difference between the two peak voltage signals. This differential or error signal generated by the amplifier 65 is fed to the holding circuit 66 supplying the focusing signal to the focusing lens driver 30 to readjust the magnitude of the current $I_{FC}$ supplied to the focusing coil 25. The current $I_{FC}$ is adjusted in the direction for equalizing the spot sizes detected at the grid resulting from focusing the beam at each of the secondary focus points, thereby setting the primary focus point to coincide with the target grid when the dithering signal is finally cut off.

The synchronized switching circuit 59 receives through the conductor 68 the dithering signal from the oscillator 49 to cycle the switching transistors 69 and 70 to alternate conducting states. The switching transistors are cycled by the dithering signal being transmitted directly to the base of the transistor 70 and, additionally, being inverted by the signal inverter 71 and thereafter transmitted to the base of the transistor 69. The spot size signals received from the full wave rectifier 52 are conducted through resistors 72 and 74 forming parallel circuits connecting respectively through diodes 75 and 76 to charge a pair of holding capacitors 77 and 78. Each capacitor has the second plate connected to ground. Thus, while the beam is being scanned across the grid 41 to generate a first spot size signal, the transistor 69 is turned on to clamp the input to the capacitor 77 to ground and, by means of the diode 75, maintain the capacitor 77 in a hold mode thereby preventing its being discharged while the transistor 70 is turned off allowing the capacitor 78 to be charged to a voltage magnitude related to the spot size signal received while the beam is focused at the one secondary focus point. On the next half cycle of the 240 cycle dithering signal, the transistor 70 is turned on, thereby allowing the capacitor 78 to be placed in a hold condition while at the same time the spot size signal indicative of the beam spot size while the beam is focused at the other secondary focus point is being fed to the capacitor 77 with the transistor 69 now set to a non-conductive state. In this manner, the sample-and-hold circuits 60 and 61 are turned on alternately to generate and store a peak voltage signal related to the beam spot size at the alternate secondary focus points. These peak voltage signals stored by each capacitor 77 and 78 are fed continuously to the differential amplifier 65 which detects the difference therebetween and feeds an amplified control signal responsive to the signal difference detected to the holding circuit 66.

The curve 82 (FIGURE 2) indicates the manner in which the control signal received by the holding circuit 66 varies responsive to the difference in spot sizes occurring as the current $I_{FC}$ is changed. Note that point 84 indicates that no error signal is supplied to the focusing lens driver 30 at the point corresponding with the minimum spot size point 35 and the maximum peak voltage of the derivative signal 58.

The holding circuit 66 comprises a holding capacitor 79 having one plate connected to ground and the other plate connected to supply the base voltage to a field-effect transistor 80 of standard design. Thus, the control signal received from the differential amplifier 65 is stored by the capacitor 79 for a long time duration since the field-effect transistor 80 presents a very high input impedance. A suitable electric current supply is connected to the terminal 81 permitting the field-effect transistor to transmit to the focusing lens driver 30 a signal having an adjusted magnitude responsive to the difference in the spot sizes detected at the target 41 positioned in place of the memory element 15. In the circuits connecting with the oscillator 49, and connecting the differential amplifier 65 and the holding circuit 66 are switches 98 and 99, respectively, which are closed with the energization of the coil 100 resulting when a signal is received at the terminals 101 responsive to the target 41 being moved into position to intercept the electron beam. Therefore, the dithering signal is supplied to the focusing lens driver only during the actual focus checking operation and does not affect the data recording function of the recorder.

To explain the operation of the circuit, assume that the electron beam is focused such that the beam spot size corresponds to the point 85 of the curve 34 (FIGURE 2) indicating the need for readjustment of the focusing of the beam. A dithering signal 49*a* is fed from the oscillator 49 (when the target is in position to receive the beam, as indicated by the closing of the switches 98 and 99) into the focusing lens driver 30 and the synchronous switching circuit 59 causing the beam spot sizes at the target resulting as the beam is focused at the secondary focus points to correspond with those indicated at points 86 and 87 on the curve 34. The alternate peak voltage derivative signals generated responsive to the beam sizes detected at the target are represented by the points 88 and 89 on the curve 57. These peak voltage signals are fed to the differential amplifier 65 thereby causing an error signal represented by point 90 on the curve 82 to be fed to the holding circuit 66 for readjusting the setting of the focusing lens driver 30. Thus, the focusing of the beam is readjusted to shift the primary focus point towards the position of the target 41. Naturally, each time the synchronous switch is cycled, a new error signal is generated for adjusting the focus setting of the lens 23.

Refocusing of the beam continues until the beam has been focused directly on the target 41. Under these conditions, when the focusing circuit is energized to supply a dithering signal 49*a* (FIGURE 2) to the focusing coil 25, the beam spot size will correspond with points 91 and 92 on curve 34. Note that the electron beam spot sizes measured in the plane of the target for each secondary focus point of the beam are equal, thereby causing the peak voltage derivative signals indicated by points 94 and 95 to be equal in magnitude. Thus, the error signal generated is as indicated at point 84 and is of zero magnitude as it should be when the beam is focused in the plane of the target 41.

The focusing circuit described is designed to act intermittently since the holding circuit 66 maintains the focusing signal for a long time duration to hold the focal power of the lens 23 constant. It is preferable that no dithering signal be supplied to the lens 23 during the actual recording of a memory element 15, therefore, the focusing operation is activated only during the changing of the memory element 15 after recording. During this time, the target 41 is shifted into the focusing position vacated by the memory element 15 with a signal indicating such has occurred appearing at the terminals 101 (FIGURE 1) and being generated by a sensing switch (not shown) which is closed by movement of the target. Thereafter, the dithering signal functions to focus the beam at each of the secondary focus points while the focusing circuits adjust the focal power of the lens 23. As a memory element 15 again is shifted into position to be recorded, the signal to the terminals 101 is cut off to inactivate the focusing circuit during the recording period. The holding circuit 66 serves to maintain the focusing of the beam to that previously set by the focusing circuit until a subsequent focusing adjustment is needed as indicated by the generation of an error signal by the focusing circuit.

While the invention has been particularly shown and described with reference to a preferred embodiment thereof, it will be understood by those skilled in the art that the foregoing and other changes in the form and details may be made therein without departing from the spirit and scope of the invention.

We claim as our invention:

1. The method of setting the focusing of a beam which is focused to a primary focus point by adjusting a focusing lens, said method comprising:

positioning a member made of material opaque to the beam adjacent to said beam, effecting relative movement between said beam and the member in a direction causing the opaque member intermittently to intercept said beam, alternately focusing the beam to secondary focus points spaced along the beam axis in front of and beyond the primary focus point, measuring the beam intensity at a point beyond the member from said beam to detect and generate first and second signals responsive to the rate of change in beam intensity passing said member as the beam is intercepted intermittently while focused respectively at the secondary focus points, comparing said first signal to said second signal to generate a differential signal, and adjusting the focusing lens responsive to the differential signal to reset the beam primary focus point.

2. In an electron beam device having a source to produce a beam of electrons for transmission along a preselected axis to a distant location, a system for focusing the beam at a predetermined point along the axis comprising:

adjustable primary focusing means for focusing the beam at a primary focus point along the axis, secondary focusing means to alternately focus the beam at secondary focus points at equal distances along the axis in front of and beyond the primary focus point, means to deflect the beam and cause it to scan to the side of the axis, a target positioned at the predetermined point along the beam axis having a portion for intercepting intermittently the beam during each scanning by the deflecting means, means to generate signals responsive to the rate of change in the beam current passing said target as the beam is scanned across the grid while being focused at each of the secondary focal points for detecting the beam spot size at each secondary focus point, means to compare said signals and generate a control signal responsive to the difference therebetween, and means to adjust said primary focus means responsive to said control signal thereby to set the primary focus point of said beam at said predetermined point.

3. A focusing system for an electron beam device as defined in claim 2 wherein said primary focusing means comprises an electro-magnetic focusing coil for establishing a magnetic field to focus said beam at focus points varying in position with the electric current flow through said coil, and a source of electric current for energizing said coil at adjustable magnitudes.

4. A focusing system as defined in claim 3 wherein said secondary focusing means comprises a source of electric current having a square wave configuration for energizing said focusing coil.

5. A focusing system as defined in claim 2 wherein said secondary focusing means is activated intermittently to adjust said primary focusing means.

6. A focusing means as defined in claim 5 wherein said target is movable into and out of the position to intercept said beam, and means is provided to activate said secondary focusing means in response to said target being shifted to a position to intercept said beam.

7. A focusing system as defined in claim 2 wherein said primary focusing means comprises an electro-magnetic focusing coil having an adjustable source of electric current for focusing said beam at a primary focus point responsive to the magnitude of said electric current supplied to said coil, said secondary focusing means comprises a source for supplying electric current to said focusing coil at a level varying between pre-selected constant magnitudes, and said means to generate signals includes an electron detector positioned beyond said target from said beam source for generating a signal responsive to the beam electron flow and a differentiating circuit connected to receive and detect the rate of change of said detector signal.

8. A focusing system as defined in claim 7 wherein said means to compare said signals comprises a pair of sample and hold circuits connected through a synchronous switch to receive the signal generated by said differentiating circuit, wherein said synchronous switch is operable responsive to the varying magnitude current supplied by said secondary focusing means.

References Cited

UNITED STATES PATENTS

| | | | |
|---|---|---|---|
| 2,690,518 | 9/1954 | Fyler et al. | 313—92.5 |
| 2,935,558 | 5/1960 | Van Winkle | 178—6.7 |
| 3,028,544 | 4/1962 | Stone | 324—20 |
| 3,356,792 | 12/1967 | Peters | 315—31 X |

RODNEY D. BENNETT, *Primary Examiner.*

J. G. BAXTER, *Assistant Examiner.*